No. 730,500. PATENTED JUNE 9, 1903.
W. S. WEIR.
JAR.
APPLICATION FILED MAY 22, 1901.
NO MODEL.
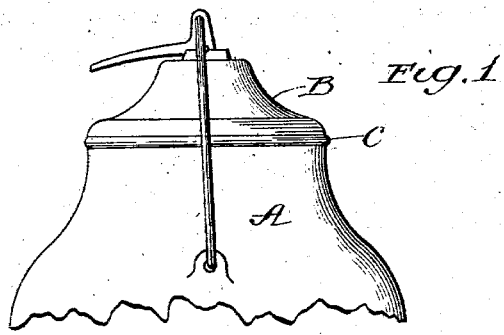
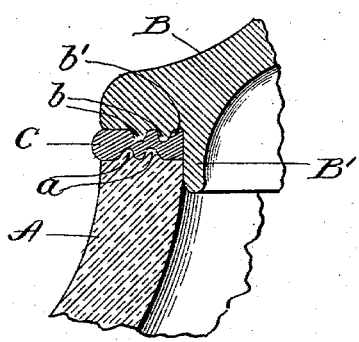
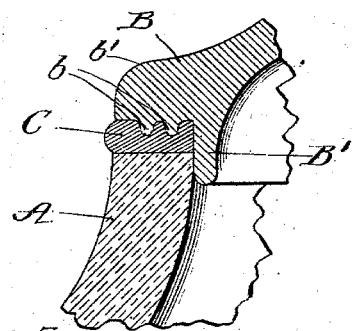
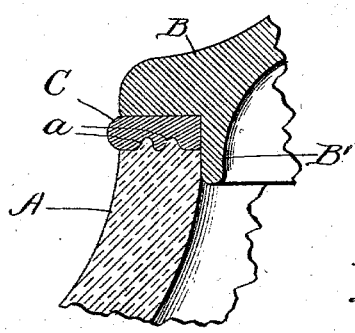
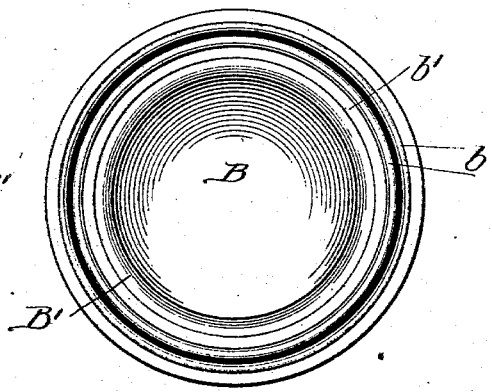
Witnesses
Inventor
William S. Weir
By his Attorneys No. 730,500.

Patented June 9, 1903.

UNITED STATES PATENT OFFICE.

WILLIAM S. WEIR, OF MONMOUTH, ILLINOIS.

JAR.

SPECIFICATION forming part of Letters Patent No. 730,500, dated June 9, 1903.

Application filed May 22, 1901. Serial No. 61,478. (No model.)

*To all whom it may concern:*

Be it known that I, WILLIAM S. WEIR, a citizen of the United States, residing at Monmouth, in the county of Warren and State of Illinois, have invented certain new and useful Improvements in Jars, of which the following is a specification.

The present invention relates to that class of jars (the term "jar" being herein used to comprehend other receptacles of a similar nature) that have means for hermetically closing them. Its object is to insure the hermetic closing of the jar, and thus insure the preservation of its contents.

This object is accomplished by providing the jar or the cover or each of them with a gasket-seat having a practically flat and comparatively broad surface which lies in a plane perpendicular to the vertical axis of the jar and a plurality of annular ribs rising from said surface, said ribs being of equal height, so that their summits all lie in a common plane parallel with the plane aforesaid and resulting in one or more annular grooves, the bottom or bottoms of which lie in the plane of the surface from which the ribs rise, or practically so, so that when the cover is forced down to its place the ribs will sink into the rubber gaskets and the rubber displaced thereby will enter and fill the groove or grooves between the ribs, so as to form an absolutely air-tight joint.

Heretofore it has been proposed to provide the gasket-seat of the cover with a single annular rib, which sinks into the gasket when the cover is forced down, and to provide the gasket-seat of the jar with an annular groove corresponding with said rib; but this is not the equivalent of a plurality of said ribs rising from an otherwise flat or practically flat surface lying in a plane perpendicular to the vertical axis of the jar and so disposed as to leave an annular groove between them and a comparatively broad and practically flat surface flanking them. Imperfections resulting during the process of manufacture or subsequent breakage frequently destroy the efficiency of a single rib. By the use of a plurality of such ribs the percentage of jars that are rendered worthless from these causes is proportionately lessened; but this is not the sole or principal advantage resulting from the use of a plurality of ribs so disposed as to leave an annular groove or grooves between them. When the cover is forced down to its seat, the rubber entering the groove or grooves expels the air, with the result that atmospheric pressure will tend to hold the rubber in the groove, or, to state it differently, the tendency of the rubber to withdraw from the groove will tend to produce a partial vacuum, which will resist the withdrawal of the rubber, and thereby form an absolutely air-tight joint, and the breaking of this vacuum is prevented by the intimate contact of the summits of the ribs along two concentric lines upon opposite sides of the groove. This is of great importance in jars used for the preservation of fruits, vegetables, and other perishable substances, especially when atmospheric pressure upon the outside of the cover (or, to state it differently, a partial vacuum within the jar itself) is alone relied upon for holding the cover in place. Within the contemplation of my invention the cover may be thus held or a mechanical contrivance may be used. In addition to the resulting grooves, each of which is a suction-space, the ribs have the effect of changing the normal shape of the elastic gasket and causing it to flow, as it were, so that it accommodates itself to inequalities in the otherwise flat gasket-seat very much more readily and perfectly than would be possible with only the limited amount of pressure available if the gasket-seat were perfectly flat. This function they perform regardless of the suction and would perform even if they were so badly chipped or broken that the suction feature would be entirely absent. These ribs are more apt to be broken and marred than any other part of the cover, and it is therefore desirable that the gasket-seat be not made up wholly of them. Hence it is that according to the present invention the gasket-seat comprises not only these ribs and the resulting groove or grooves, but also the comparatively broad and substantially flat surface from which the ribs rise.

A plurality of ribs, such as above described, may be used on both of the gasket-seats—*i. e.*, the gasket-seat of the cover and the gasket-seat of the jar—and in this event they are preferably arranged so that they alternate, the ribs on one falling opposite the intervening grooves on the other.

In the accompanying drawings, which are made a part of this specification, Figure 1 is a sectional elevation of the upper portion of the jar embodying the invention. Fig. 2 is an enlarged section of a portion thereof. Figs. 3 and 4 are enlarged sections of portions of a jar embodying modifications of the invention; and Fig. 5 is an under side view of the cover, showing the gasket-seat.

A represents the jar, the gasket-seat of which comprises a plurality of concentric annular ribs $a$, rising from a flat or practically flat surface $a'$, which lies in a plane perpendicular to the vertical axis of the jar.

B represents the cover, the gasket-seat of which comprises a plurality of annular ribs $b$, rising from a flat or practically flat surface $b'$, lying in a plane perpendicular to the vertical axis of the jar. The annular ribs of each of the gasket-seats are of equal height, so that their summits lie in a common plane parallel with the aforesaid flat surface from which they rise and so that the bottom or bottoms of the resulting annular groove or grooves is in the plane of said surface or substantially so. Preferably the ribs are of approximately V shape in cross-section, and so disposed that the resulting groove is of substantially the same shape; but the invention is not limited in this respect and the ribs may be of any other desired shape.

Where the gasket-seats on both the cover and the jar are provided with these annular ribs, they are arranged to alternate, as shown more clearly in Fig. 2. The cover is provided with an annular flange $B'$, which projects into the mouth of the jar and is immediately adjacent to the inner flat surface of the gasket-seat, resulting in an annular groove adjacent to the inner rib $b$.

Fig. 2 shows the gasket-seats of both the jar and the cover as being provided with the annular ribs.

Fig. 3 shows the gasket-seat of the cover alone provided with them, and Fig. 4 shows the gasket-seat of the jar alone provided with them.

C is the gasket, which consists of a ring of soft rubber and which when in place contacts with the flange $B'$, thereby making air-tight the joint between said flange and the mouth of the jar.

For forcing the cover to its seat and holding it either permanently or until the partial vacuum is formed within the jar I have shown the mechanical contrivance which is disclosed by United States Letters Patent No. 672,049, which were granted to me April 16, 1901.

The invention is of especial value where the cover is held in place by atmospheric pressure alone. In these cases the cover is forced to its seat while the contents of the jar are hot, so that upon cooling a partial vacuum will be formed within the jar, with the result that the atmospheric pressure will hold the cover in place even after the means for putting it in place have been removed.

What I claim as new, and desire to secure by Letters Patent, is—

1. A jar having a gasket-seat comprising a flat surface lying in a plane perpendicular to the axis of the jar and a plurality of annular ribs of equal height projecting from said surface and resulting in an intervening annular groove in combination with a gasket and a second gasket-seat on the cover comprising a flat surface lying in a plane perpendicular to the axis of the jar and a plurality of annular ribs of equal height projecting from said surface and resulting in an intervening annular groove, the ribs of one seat being arranged to alternate with the ribs on the other seat, substantially as described.

2. A jar having around its mouth a gasket-seat comprising a flat surface lying in a plane perpendicular to the axis of the jar, a plurality of annular ribs of equal height projecting from said surface and resulting in an intervening annular groove in combination with a gasket and a cover having a flange adapted to extend into the mouth of the jar and having also a gasket-seat comprising a flat surface lying in a plane perpendicular to the axis of the jar and a plurality of annular ribs of equal height projecting from said surface and resulting in an intervening annular groove, the ribs of one seat being arranged to alternate with the ribs of the other seat, substantially as described.

WILLIAM S. WEIR.

Witnesses:
W. W. McCullough,
H. M. Richards.